United States Patent [19]

Addiego et al.

[11] Patent Number: 5,212,130
[45] Date of Patent: May 18, 1993

[54] HIGH SURFACE AREA WASHCOATED SUBSTRATE AND METHOD FOR PRODUCING SAME

[75] Inventors: William P. Addiego; Irwin M. Lachman; Mallanagouda D. Patil, all of Corning; Jimmie L. Williams, Painted Post; Melcenia R. Williams; Kenneth E. Zaun, both of Corning, all of N.Y.

[73] Assignee: Corning Incorporated, Corning, N.Y.

[21] Appl. No.: 848,081

[22] Filed: Mar. 9, 1992

[51] Int. Cl.$^5$ .................. B01J 21/04; B01J 23/02; B01J 32/00
[52] U.S. Cl. .................. 502/60; 502/300; 502/341; 502/439; 423/213.5
[58] Field of Search ............ 502/341, 439, 60, 300; 423/213.5

[56] References Cited

U.S. PATENT DOCUMENTS

| | | | |
|---|---|---|---|
| 4,642,302 | 2/1987 | Wood et al. | 502/332 |
| 4,678,770 | 7/1987 | Wan et al. | 502/304 |
| 4,771,028 | 9/1988 | Arai et al. | 502/341 |
| 4,904,633 | 2/1990 | Ohata et al. | 423/213.5 X |
| 4,959,339 | 9/1990 | Arai | 502/302 |
| 4,960,574 | 10/1990 | Bricker | 423/213.5 |
| 4,965,243 | 10/1990 | Yamada et al. | 502/304 |
| 5,041,407 | 8/1991 | Williamson et al. | 502/303 |
| 5,051,392 | 9/1991 | Mabilon et al. | 502/303 |
| 5,063,192 | 11/1991 | Murakami et al. | 502/303 |
| 5,075,275 | 12/1991 | Murakami et al. | 502/303 |

FOREIGN PATENT DOCUMENTS

| | | |
|---|---|---|
| 0443765A1 | 2/1991 | European Pat. Off. |
| 119939 | 5/1990 | Japan. |
| 198641 | 8/1990 | Japan. |
| 969637 | 9/1964 | United Kingdom. |

Primary Examiner—W. J. Shine
Attorney, Agent, or Firm—L. Rita Quatrini

[57] ABSTRACT

A washcoated substrate and method for producing the washcoat on the substrate are disclosed which comprises forming a slurry comprising at least one ionizable compound of A, where A is selected from barium, strontium, and combinations thereof, and A is in an amount sufficient to yield AO in an amount of about 0.2-20% by weight of the washcoat, an aluminum oxide yielding species, and a medium wherein at least a portion of the ionizable compound ionizes to form ions of A, contacting the slurry with a substrate to form a green coating containing A and the aluminum oxide yielding species thereon, and heat treating the resulting green-coated substrate at a temperature and for a time sufficient to form a washcoat consisting essentially of AO-$Al_2O_3$ on the substrate, wherein A is homogeneously distributed throughout the $Al_2O_3$, the washcoat having a specific surface area, as measured by the $N_2$ BET method, of at least about 50 m$^2$/g, which surface area remains after at least two repeated exposures of the washcoat to temperatures of greater than about 500° C. Additionally, the slurry solid can be removed from the liquid, fired to form a material comprising AO-$Al_2O_3$, and another slurry formed of the fired material and a medium. This slurry can then be contacted with a substrate to form the green coating which is then heat treated to form the washcoat.

30 Claims, 2 Drawing Sheets

HIGH SURFACE AREA WASHCOATED SUBSTRATE AND METHOD FOR PRODUCING SAME

BACKGROUND OF THE INVENTION

This invention relates to a method for producing a high surface area washcoat are suitable for use as supports for catalysts. The washcoats are made essentially of $AO-Al_2O_3$ wherein A is Ba and/or Sr. The high surface area is achieved by a method which involves forming the $AO-Al_2O_3$ by contacting element A in the ionic form with an aluminum oxide yielding species followed by firing to result in the A being homogeneously distributed throughout the $Al_2O_3$. The high surface area is maintained over long periods of time under conditions of high temperature which are encountered in applications. The washcoated substrates provide supports for a wide variety of catalysts. The washcoat can be impregnated with a catalyst metal precursor which is fired to form a highly dispersed catalyst. The high surface area afforded by the washcoated substrates preserves the active sites for the catalyst, especially the catalyst metals, thus prolonging the life of the catalyst.

Catalysts for the oxidation of carbon monoxide and hydrocarbons, and for the reduction of nitrogen oxides of automobile exhaust emissions, are dispersed on washcoated metal or ceramic monoliths as automotive catalytic converters. Cerium oxide and/or cerium nitrate is usually mixed with gamma alumina to help improve catalytic performance, by providing oxygen under rich fuel conditions and is used also in a washcoat to increase dispersion of the metal catalysts, enhancing apparent catalytic activity The surface area of gamma alumina decreases significantly during the aformentioned catalytic reactions at temperatures above about 600° C. as the system ages. The result of this "washcoat sintering" is the loss of alumina surface area (and therefore adsorption sites for the metal catalyst). This results in a decrease of metal dispersion with a resultant lowering of catalytic activity.

It would be advantageous therefore, to have a high surface area washcoated substrate which can function as a catalyst support at high temperatures without any significant loss of surface area and activity.

SUMMARY OF THE INVENTION

In accordance with one aspect of the invention, there is method for producing a washcoat on a substrate which comprises forming a slurry comprising at least one ionizable compound of A, where A is selected from barium, strontium, and combinations thereof, and A is in an amount sufficient to yield AO in an amount of about 0.2-20% by weight of the washcoat, an aluminum oxide yielding species, and a medium wherein at least a portion of the ionizable compound ionizes to form ions of A, contacting the slurry with a substrate to form a green coating containing A and the aluminum oxide yielding species thereon, and heat treating the resulting green-coated substrate at a temperature and for a time sufficient to form a washcoat consisting essentially of $AO-Al_2O_3$ on the substrate, wherein A is homogeneously distributed throughout the $Al_2O_3$, the washcoat having a specific surface area, as measured by the $N_2$ BET method, of at least about 50 $m^2/g$, which surface area remains after at least two repeated exposures of the washcoat to temperatures of greater than about 500° C.

In accordance with another aspect, the slurry solid can be removed from the liquid, fired to form a material comprising $AO-Al_2O_3$, and another slurry formed of the fired material and a medium. This slurry can then be contacted with a substrate to form the green coating which is then heat treated to form the washcoat.

In accordance with another aspect of the invention, there is provided a washcoated substrate made by the above described methods.

DETAILED DESCRIPTION OF THE INVENTION

Figure 1:
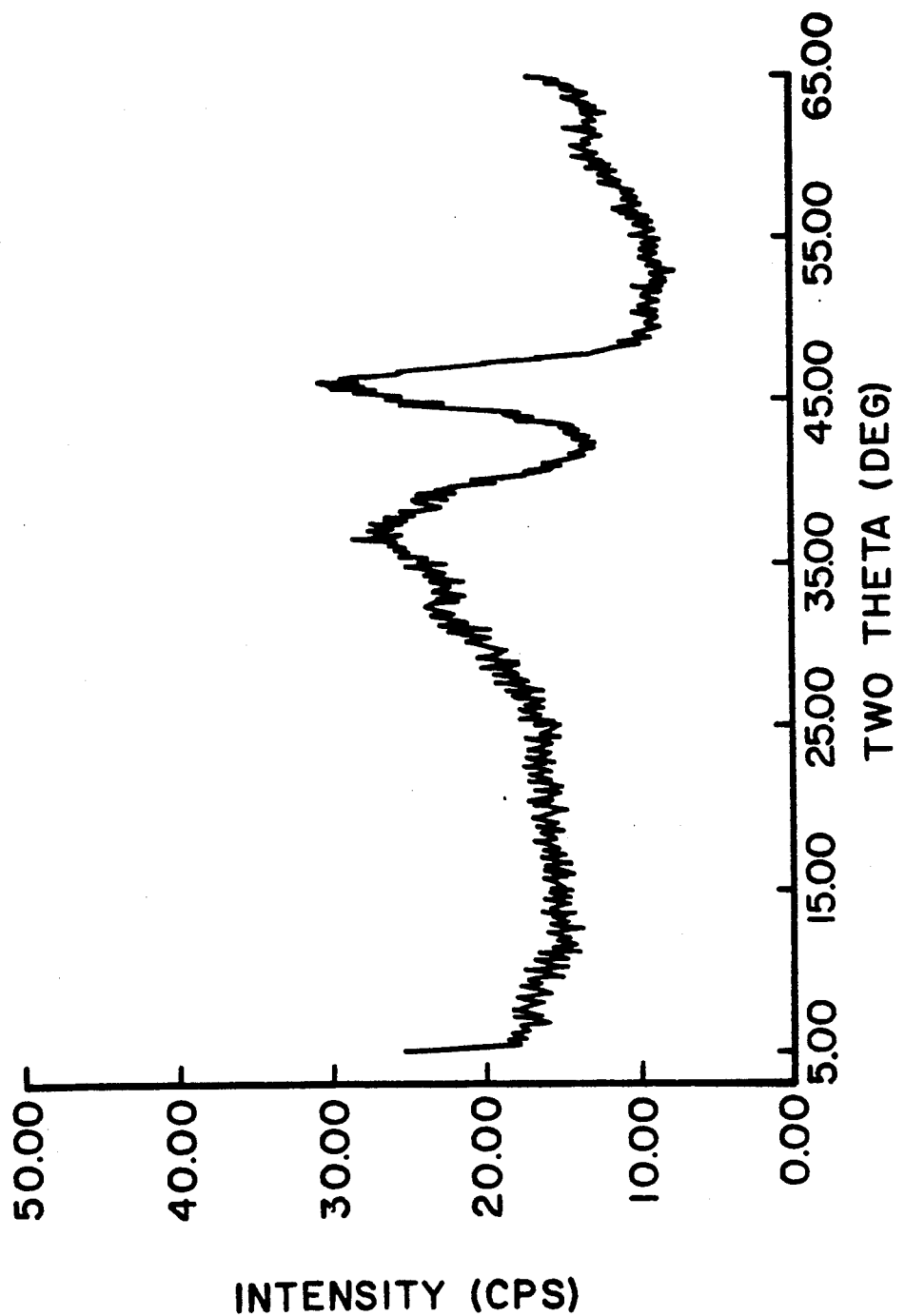
FIG. 1 is plot of surface area versus weight percent BaO in the $BaO-Al_2O_3$ washcoat after heat treating for about 6 hours at temperatures of about 600° C. and about 1000° C., in which the source of $Al_2O_3$ is Catapal B Boehmite.

This invention relates to a method for producing high surface area washcoated substrates which maintain their surface area and activity over long periods of time on continuous and cyclic exposure to high temperature environments in the application. The high surface area benefits are realized by forming a washcoat of a species of of $AO-Al_2O_3$ wherein A is Ba and/or Sr. The A is believed to be associated with the $Al_2O_3$. This is done by contacting A in the ionic form with an aluminum oxide yielding species followed by firing or heat treating. The A is homogeneously distributed in the alumina. The active sites on the washcoat for the catalyst are preserved over long periods of time thereby prolonging the life and activity of the catalyst. It is especially advantageous to impregnate the washcoat with a metal catalyst precursor and thereafter to fire it to form a highly dispersed metal catalyst thereon. Additionally, it is advantageous to incorporate one or more molecular sieves, for example, zeolites into the washcoat.

The washcoat of the present invention can be formed by a technique in which a slurry is made of at least one ionizable compound of element A which can be Ba and/or Sr, and preferably Ba, an aluminum oxide yielding species, optionally an effective amount of rheological modifiers, binders, and combinations thereof, and a medium in which the ionizable compound or compounds at least partially ionize. The slurry is applied directly to a substrate followed by heat treating to form the $AO-Al_2O_3$ washcoat. For purposes of the present invention, this technique will be called the single slurry technique.

Alternately, the washcoat can be formed by forming a slurry as described above. The medium is then removed by drying techniques, and the resulting solid is fired to form the $AO-Al_2O_3$. Another slurry is made with the $AO-Al_2O_3$ which is then contacted with a substrate or coated on the substrate. The substrate is then heat treated fired to form the washcoat. This technique will be called the double slurry technique.

The single slurry technique is advantageous because the washcoat is formed from only one slurry as opposed to preforming the AO-Al$_2$O$_3$ and forming a second slurry.

The double slurry technique is advantageous when greater control of the amounts of AO-Al$_2$O$_3$ is desired. Forming the AO-Al$_2$O$_3$ prior to contact with the substrate assures that the ratio of A to Al$_2$O$_3$ is fixed.

The slurry media in this invention can be any media in which the components can be dispersed and in which the ionizable compound or compounds at least partially ionize. Some suitable media can be aqueous, or non-aqueous media such as alcohol or ketone. The most preferred medium is water.

The ionizable compound or compounds of A can supplied by any compound of Ba and/or Sr that is capable of ionizing in solution and existing as a free ion in solution, and that is soluble (or can be made soluble by, for example, pH adjustment) in the slurry medium to an extent sufficient to enable effective contact with aluminum oxide yielding species to subsequently form the AO-Al$_2$O$_3$. Some typical compounds are their respective acetates, hydroxides, oxides, alkoxides, salts peroxides, mixed metal compounds with transition metals, etc. Some compounds that are especially suited to the practice of the present invention are barium acetate, barium hydroxide, barium oxide, barium alkoxides, and mixtures thereof. Barium acetate and barium hydroxide are especially advantageous to the practice of the present invention because they are readily soluble or can be made readily soluble by adjustment of pH.

The aluminum oxide yielding species according to the present invention is aluminum oxide itself, or an alumina precursor that can yield aluminum oxide on further treatment, e.g., heat treating, or combinations of these. Advantageously the aluminum oxide yielding species yields aluminum oxide when exposed to elevated temperatures such as the heat treating temperatures, and the temperatures can be as high as about 1200° C. Advantageously, the aluminum oxide yielding species are any one or combinations of various forms of aluminum oxide, aluminum hydroxides such as bayerite (Al(OH)$_3$), aluminum hydroxylated oxides, such as boehmite (AlOOH), aluminum alkoxides, such as aluminum isopropoxide (Al(C$_3$H$_7$O)$_3$), peroxides, salts, mixed metal compounds with transition metals, and combinations thereof. Some typical aluminum oxides are alpha alumina, gamma alumina, delta alumina, kappa alumina, eta alumina, theta alumina, rho alumina, and chi alumina. Some especially preferred aluminum oxide yielding species are gamma alumina, aluminum hydroxides, aluminum hydroxylated oxides, aluminum alkoxides, or combinations of these.

In addition to the above components the slurry can have other components which render the slurry in a form suitable for application to the substrate, such as at least one rheological modifier and/or at least one binder. The rheological modifiers are agents which when present in the slurry modify the rheological properties of the slurry so that it can be applied uniformly to the substrate and for good structural integrity and to prevent unsatisfactory coating characteristics, e.g., cracking, chipping, and flaking. Rheological modifiers can be surfactants, dispersants, wetting agents, drying agents, which are soluble or insoluble in the slurry medium, and acids or bases. Some examples of rheological modifiers are rare earth oxides, stearic acid, oxalic acid, commercial surfactants, etc. Some of the aluminum oxides such as boehmite, and aluminum hydroxylated oxides, for example, can function also as rheological modifiers. The preferred rare earth oxides are those of the "cerium subgroup", that is, elements of atomic number 57-62, particularly cerium and lanthanum. Cerium oxide is most preferred.

The binder or binders are present in the slurry to promote interparticle adhesion between the ionizable compounds and the aluminum oxide yielding species, as well as adhesion to the substrate. The binder or binders must be compatible with the other slurry components and the slurry medium. Some examples of binders are colloidal sols, e.g., alumina sols, or colloidal alumina having an average particle size, for example, of about 2 to 50 nanometers in diameter. Other aluminum oxides yielding species can function also as binders, e.g., boehmite. Preferred binders are colloidal alumina, boehmite, and combinations thereof.

Single Slurry Technique

A slurry is first formed consisting essentially of the ionizable compound, the aluminum oxide yielding species, and optionally, the rheological modifiers and binders as described previously. In the slurry, the ionizable compound at least partially ionizes to form ions of A. There is an attraction, believed to be an electrostatic attraction for the A ions for the appropriately charged surface sites on the Al$_2$O$_3$ species, or an adsorption of A ions onto the surface of the Al$_2$O$_3$ species.

The slurry components are added in amounts sufficient to result in the desired levels of the respective components in the washcoat. Those skilled in the art would know what amounts of slurry components to use.

The amount of slurry medium is sufficient to dissolve the ionizable compound and to evenly disperse the insoluble components. Some preferred types of slurries are given in the examples that follow.

Some examples of preferred slurry compositions, although it is to be understood that the invention is not limited to these, are as follows with water as the medium:

Barium acetate-boehmite and/or aluminum alkoxides-ceria
Barium acetate-boehmite-gamma alumina
Barium hydroxide-boehmite-gamma alumina
Barium hydroxide-aluminum isopropoxide
Barium isopropoxide-alumina
Barium chloride-alumina
Barium perchlorate-alumina
Barium bromide-alumina
Barium nitrite-alumina
Strontium acetate-alumina
Strontium chloride-alumina
Strontium iodide-alumina
Strontium nitrite-alumina
Strontium lactate-alumina If a catalyst or catalyst component is to be incorporated onto the washcoat, it can be introduced into this coating slurry and applied to the substrate simultaneously with the AO-Al$_2$O$_3$. One example of an advantageous catalyst component which can be characterized as a catalyst or catalyst support is at least one molecular sieve, with the preferred types being zeolites. Zeolites can be with or without an exchanged metal such as, for example, rhodium. Zeolites with a high silica/alumina ratio, eg., of at least about 20/1 preferably about 50/1 and most preferably about 1200/1 are thermally stable. Some preferred zeolites are pentasil structure types, mordenites, Y-type, beta zeolites, and combinations thereof. Preferred are ZSM-zeolites such as ZSM-5 zeolites, which are preferably exchanged with rhodium.

An example of a preferred slurry composition, although it is to be understood that the invention is not limited to such, is as follows:

barium acetate-boehmite and/or aluminum alkoxidesceria-zeolite, in water.

The slurry is then contacted with a substrate to form a green coating of A and the aluminum oxide yielding component thereon. This can be done by any convenient technique such as dipping, spraying, or washing, depending on size and geometry of the substrate, and the invention is not limited to any technique. However, most typically it is done by dipping the substrate in the slurry followed by drying. Excess slurry is removed from the substrate by being blown off. The dipping and drying is repeated if necessary until the desired amount of slurry components are applied.

The substrate can be in general, any type that can hold the washcoat. It is to be understood that the invention is not limited to the nature of substrate materials. However, the substrate is most desirably made of any material that is suitable for high temperature applications. Some preferred materials are those that include as a predominant phase: ceramic, glass-ceramic, glass, cermet, metal, carbon, high surface area-high temperature stable oxides, and combinations thereof. By combinations is meant physical or chemical combinations, eg., mixtures or composites. Some substrate materials that are especially suited to the practice of the present invention, although it is to be understood that the invention is not limited to these, are those made of cordierite, mullite, clay, talc, zircon, zirconia, spinel, alumina, silica, lithium aluminosilicates, alumina quartz, feldspar, titania, fused silica, nitrides, carbides, e.g., silicon carbide, silicon nitride or mixtures of these. Some typical ceramic substrates are disclosed in U.S. Pats. No. 4,127,691 and 3,885,977. Those patents are herein incorporated by reference as filed. Some preferred metal substrates are stainless steels and iron group metal based bodies, (Fe, Co, Ni) such as, for example, Fe and Cr and/or Al bodies with optional additions of various metals and/or oxides for various properties and applications. Some typical metal or metal alloy bodies are disclosed in U.S. Pat. Nos. 4,758,272 and 4,992,233 and U.S. application Ser No. 767,889, filed Sept. 30, 1991. Those patents and application are herein incorporated by reference as filed. The substrates can be of any size and shape suitable to the application. Preferred substrates are honeycomb structures Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$) These bodies are made preferably of, but not limited to, materials which when fired form cordierite. Typical wall thicknesses in catalytic converter applications, for example, are about 6 mils (about 0.15 mm) for 400 cells/in$^2$ (62 cells/cm$^2$) honeycombs Web thicknesses range typically from about 4 to about 25 mils (about 0.1 to about 0.6 mm). The external size and shape of the body is controlled by the application, e.g. engine size and space available for mounting, etc.

The substrate can have any degree of porosity from low to high. For example, typically the open porosity ranges from about 1% by volume to higher values which are determined by practical limits depending on the composition of the substrate and the intended application. For example, in metal monoliths, the open porosity is typically about 1 to about 2% by volume, although it can be as high as about 40%. For ceramic monoliths, the open porosity is typically about 39% to about 50% by volume The invention is especially suited for low-to-moderate porosity bodies, that is, those having total porosities of about 1% to about 35% by volume The washcoat of the present invention affords the high surface area for catalyst support while the low porosity of the body and its associated advantages are retained By green coating according to the present invention is meant the coating before it is subjected to heat treating.

The resulting green coated substrate is then typically dried to remove the slurry medium and other liquid phases that can be present.

The green coated substrate is then heat treated at a sufficient temperature for a sufficient time to form the AO-Al$_2$O$_3$ as a washcoat on the substrate, and to bond the particulates of the washcoat to the substrate and to each other. The heat treating conditions vary with the specific slurry components, size and configuration of the substrate, and other processing conditions. However, in general the heat treating conditions are about 500° C. to about 700° C. for about 3 to about 6 hours.

The AO-Al$_2$O$_3$ forms in the heat treating step is believed to be an associated species of AO with the Al$_2$O$_3$. in which A is homogeneously dispersed throughout the Al$_2$O$_3$. For example, when a barium compound is used, the associated species is BaO-Al$_2$O$_3$. The Ba is interacted with the Al surface oxygen, e.g., by being adsorbed on the Al$_2$O$_3$ surface Inclusion of a washcoat on a substrate as described according to the present invention affords a high surface area. The surface area of the washcoat is typically no less than about 50 m$^2$/g, more advantageously no less than about 150 m$^2$/g and most advantageously about 180 to about 250 m$^2$/g. The surface area is measured by the N$_2$ BET method which is known in the art The surface area is measured as specific surface area, that is, the surface area divided by the mass of a powder sample having essentially the same composition as the washcoat. The high surface area of the washcoat helps maintain the dispersion of any catalyst that is to be supported thereon. Moreover, the high surface area is maintained even on at least two repeated exposures to high temperatures of greater than about 500° C., thus enhancing its life and usefulness. The high surface area of the washcoat helps maintain the dispersion of the catalyst The AO makes up nominally about 0.2 to about 20% by weight of the washcoat, with the balance being substantially alumina and other phases such as binder and rheological modifier phases. Minor amounts of other phases can present to the extent that they do not affect the surface area properties of the washcoat. Typically any one rheological modifier or binder makes up no more than about 25% by weight of the washcoat.

The BaO content is advantageously about 8% to about 12% by weight.

The CeO content is advantageously about 20% to about 25% by weight.

The binder content is advantageously about 5% to about 10% by weight.

Some compositions that are especially suited to the practice of the present invention are given in the Table below in weight percent.

TABLE

| # | BaO | CeO$_2$ | Binder* |
|---|-----|---------|---------|
| 1 | 0.2-20 | 20-25 | 5-10 |
| 2 | 2-20 | 20-25 | 5-10 |
| 3 | 2-20 | 0.1-25 | 0-10 |
| 4 | 2-20 | 0.1-15 | 0-10 |
| 5 | 2-20 | 0.1-5 | 0-10 |
| 6 | 8-12** | 0.1-25 | 0-10 |
| 7 | 8-12** | 0.1-15 | 0-10 |
| 8 | 8-12** | 0.1-5 | 0-10 |

Balance substantially Al$_2$O$_3$.
Minor amounts of other phases can be present to the extent that they do not affect the surface area properties of the washcoat.
*Boehmite and/or colloidal alumina
**preferably about 10%

The washcoat can be impregnated with at least one metal catalyst precursor followed by firing the resulting impregnated washcoat to form a highly dispersed metal catalyst on the washcoat. This is done typically by dipping, spraying, or washing the washcoated substrate with a solution of the metal salt. This impregnation technique of applying metals to a substrate is known in the art. The metals used as catalysts are known in the art and the invention is not limited to the type of metals that can be used. This depends on the particular application. Some metals which can be used are transition metals and Mg, Bi, and Sb. However, most typically the metals are transition metals such as base metals and noble metals. Impregnation of an already formed washcoat with the transition metal affords the advantage of more control over the amount of metal that is actually incorporated into the washcoat, and over the degree of dispersion in the washcoat. By incorporating the metal in this way, the pH of the impregnating transition metal solution can be better controlled for the most effective impregnation. If the metal is in a slurry with other components, pH control cannot always be realized depending on what other components are present. Also, when the metal is applied in a separate step, the morphology of the metal does not change, thereby insuring uniformity of metal on the washcoat. If the metal is in a slurry with other components, it can possibly interact with them, with a resultant morphology change. This can inhibit effective incorporation into the washcoat, which can result in decreased catalytic activity. By the method of the present invention, the metal is more efficiently utilized and losses in incorporation of the metal are minimized. This is very important since these metals are very expensive.

In accordance with one embodiment of the single slurry technique, a BaO-Al$_2$O$_3$ washcoat is made with use of barium hydroxide typically in either the anhydrous powder form or a hydrated crystal form in conjunction with an alumina yielding species or precursor which is preferably alumina, most preferably gamma alumina, and/or boehmite. The process involves typically the formation of an aqueous or non-aqueous slurry of barium hydroxide and alumina in which the mean particle size the solids is preferably between 4 and 7 micrometers in diameter, although it is not necessarily limited to this range. Boehmite, aluminum hydroxylated oxides, and other rheological modifiers such as inorganic acids, commercially available surfactants, such as Surfynol® by Air Products, are added to the slurry.

The boehmite is activated as a sufficiently dispersed solid so that it functions as an inorganic binder for the washcoat during drying and heat treating, as well as a washcoat component. The binding capacity of the boehmite is activated by lowering the pH of the slurry to below about 7, and preferably below about 5.5. Lowering the pH is also necessary to enhance the dispersion/solvolysis of barium hydroxide in the slurry, as well as lowering the slurry viscosity. The pH of the slurry is lowered by using an acid, preferably nitric acid. The viscosity of the slurry can adjusted if necessary by addition of water or additional slurry medium. The slurry viscosity is lowered enough to easily coat a substrate surface. Initial removal, e.g., by evaporation of the dispersing medium, for instance, water, promotes the formation of a washcoat gel that sets on the substrate surface, and then quickly dries in an oven (with air or other gases) at equal to or greater than about 50° C. to form a finely knit layer or coating. The effect of the gel is to promote a stable molecularly or ionically dispersed homogeneous distribution of the BaO-Al$_2$O$_3$ prior to drying and heat treating.

Double Slurry Technique

In accordance with the double slurry technique a slurry (first slurry) is prepared in essentially the same manner and with essentially the same components as described previously for the single slurry technique. A solid phase forms in the slurry which comprises Al$_2$O$_3$ and the species Other phases can be present in the solid depending on rheological modifier and binder phases and catalyst materials that were originally added to the slurry.

The resulting slurry solid is then removed from the resulting slurry liquid. This is done typically by allowing the resulting solids to settle, or by centrifugation, and then removing them by filtration or decantation. The solids are dried to form a powder.

The powder is then fired at a sufficient temperature for a sufficient time to form a fired solid which contains the AO-Al$_2$O$_3$. The firing conditions must be sufficient for the decomposition of any organic volatiles that might be present. Conditions can vary depending on specific materials, and equipment. However, the firing temperature is typically about 500° C. to about 600° C. and the firing times are typically about 3 to about 6 hours.

Another (second) slurry is then formed of the associated AO-Al$_2$O$_3$ species in a medium. This second slurry can have the same additional components, that is, rheological modifiers, binders, catalyst components, etc. as the first slurry.

This second slurry is then applied to a substrate in essentially the same manner as the slurry is applied to the substrate in the single slurry technique.

In accordance with one embodiment of the double slurry technique, a first slurry is made by adding barium acetate and acetic acid to boehmite or another alumina phase, e.g., aluminum alkoxides, in water. These materials are then buffered to a pH of typically less than about 2.5, with acetic acid to prevent premature gelling. The resulting mixture is made homogeneous by known techniques such as agitation. Once the materials are homogenous, gelling is induced by the addition of water. Water and other volatile agents are evaporated and the gel is further dried and then heat treated to produce BaO-Al$_2$O$_3$. This is typically at about 500° C. for about 6 hours. The $BaO-Al_2O_3$ and nitric acid are added to water to form a second slurry. Nitric acid is used typically to lower viscosity of the second slurry and to activate binding properties of boehmite if boehmite is used as the binder.

The washcoated substrates of the present invention are especially advantageous for, although not limited to, supporting catalysts for conversion of auto exhaust pollutants as $NO_x$, CO, and hydrocarbons to innocuous products as $CO_2$, $H_2O$, $N_2$, and $H_2$ using noble metals.

To more fully illustrate the invention, the following non-limiting examples are presented. All parts, portions, and percentages are on a weight basis unless otherwise stated.

EXAMPLE 1

About 60 parts of barium hydroxide octahydrate are dissolved in about 133 parts of hot deionized water, acidified with $HNO_3$ to a pH of about 2-3, and added to about 100 parts of gamma alumina and mixed thoroughly. The resulting slurry is agitated and ball-milled with refractory alumina media, or similarly effective material or method, to reduce the mean particle size in the slurry to about 4-5 micrometers in diameter. About 18 parts of boehmite, about 3 parts of stearic acid, and about 4.5 parts of oxalic acid are added to the slurry with about 50 parts of water, or enough water to decrease the solid (gamma alumina, boehmite, and barium hydroxide) content in the slurry to about 40-42% by weight The slurry is mixed and ground again on rollers using grinding media as described above, for about 20-30 minutes. The pH of the slurry is adjusted to a pH of about 5.6-4.6, preferably about 5.3 with nitric acid solution made by adding about 0.17 parts of concentrated nitric acid per part of slurry solid added in the form of a solution such that the acid solution when added to the slurry lowers the slurry solid content to about 35-38%. The resulting pH adjusted slurry is then ball-milled for about 1-2 hours, or until it is consistently homogeneous. The viscosity of the slurry is adjusted by addition of water until the solid content is about 28-30%. The substrate is a low porosity material such as a metal with a metal oxide surface. The substrate is dipped into the slurry, removed, and stripped of excess slurry by jetting air over the coated surface. During the initial drying stage, a transient gel forms and sets. With continued drying, e.g., in an oven, a solid coating forms on the substrate surface (i.e. metal oxide surface). This procedure can be repeated after drying, allowing homogeneous layers of green washcoat on the substrate The washcoated substrate is then heat treated at about 600° C. resulting in formation of final washcoat of $BaO-Al_2O_3$. The final composition of the washcoat after heat treating is about 20% barium oxide and about 80% gamma alumina.

EXAMPLE 2

This overall method involves the use of a prepared $BaO-Al_2O_3$ powder that is heat treated prior to use in a washcoating slurry. This powder, a binder, such as boehmite or colloidal alumina, ceria, and optionally, a zeolite are added in the appropriate proportions to a slurry medium (water). The pH is adjusted to about 4.6-5.6 with nitric acid and ball-milled until the mean particle size of the solids is about 4-6 micrometers in diameter. After ball-milling, the pH is again adjusted to about 4.6-5.6 if necessary. Honeycombs are dipped into the slurry.

The details of the method are as follows. In preparation of the $BaO-Al_2O_3$ powder, an appropriate amount of barium acetate is dissolved in glacial acetic acid. For instance, about 16.9 parts of barium acetate is dissolved in about 100 parts of glacial acetic acid and added to about 81.4 parts of Catapal B boehmite, (in which about 30% loss of water during subsequent heat treating is accounted by weight), with constant mixing to form a homogeneous slurry. The slurry is gelled by addition of water. The gel is dried at about 80°-100° C. It is then heat treated at about 600° C. for about 6 hours. After heat treating, the BaO content is about 15% in the powder.

In order to form the washcoating slurry, the $BaO-Al_2O_3$ powder is added to binder, ceria, (optionally the zeolite) and water, in that the weight of all washcoat solids after heat treating is about 100 parts: about 23 parts of ceria, either boehmite or colloidal alumina (about 14.3 parts of boehmite, or about 50 parts of colloidal alumina such as Nyacol Al-20), and about 67 parts of the $BaO-Al_2O_3$ are added to sufficient water to make the solid content of the slurry about 40-50%. The pH of the slurry is adjusted to about 4-5 with nitric acid. The solids composition which will form the final washcoat is about 23% ceria, 10% alumina from the binder, and about 67% of $BaO-Al_2O_3$ where Bao is about 10% in the final washcoat composition. The slurry is ball-milled until the median particle size of the solids is about 4-6 micrometers in diameter. Acidity is adjusted to pH of about 5 with nitric acid if necessary, and the solid content is adjusted to about 30-40% with additional water. A honeycomb is immersed into the slurry, removed, and excess slurry is cleared off the honeycomb. The washcoated honeycomb is dried. The process is repeated until the desired amount of coating is achieved. Afterwards, the green washcoated honeycomb is heat treated typically at about 600° C. for about 6 hours. After the washcoated honeycomb is heat treated, it is immersed in solution of the desired catalyst salt, as is known in the art.

EXAMPLE 3

About 20.1 parts of barium hydroxide octahydrate are dissolved in hot water (>75° C.) and acidifed to pH <2 with nitric acid. This also helps to dissolve any barium carbonate that might be present. This solution is added to about 78.9 parts of Catapal B boehmite, (in which about 30% loss of water during subsequent heat treating is accounted by weight), with constant mixing to form a homogeneous prewashcoating slurry. The slurry is dried at about 80°-100° C. The resulting solid is then heat treated at about 600° C. for about 6 hours to form $BaO-Al_2O_3$. After heat treating, the BaO content is about 15%. To form the washcoating slurry, the $BaO-Al_2O_3$ is added to binder, ceria, zeolite, and water in that the weight of all the solids after heat treating is about 100 parts: about 20 parts of ceria, either boehmite or colloidal alumina as binder (about 7.1 parts of boehmite or about 25 g of Nyacol Al-20 colloidal alumina), about 10 parts of zeolite or M-zeolite (the type of which is arbitrary and which can contain one or several exchanged transition metals, M), and about 65 parts of the $BaO-Al_2O_3$. The solids content of the slurry is about 40-50% and the pH is adjusted to about 4.6-5.6 with nitric acid. The final washcoat solids composition is about 20% ceria, about 5% alumina from binder, about 10% zeolite or M zeolite, and about 65% $BaO-Al_2O_3$ (where BaO is about 10% in the final washcoat. The slurry is ball-milled until the particle size of the solids is about 4-6 micrometers in diameter. The pH is adjusted to about 5, if necessary, and the solid content is adjusted to about 30-40% with additional water. The honeycomb is immersed into the slurry, removed, and the excess slurry is cleared off. The honeycomb washcoat is dried. The process of immersing and drying is repeated until the desired amount of coating is achieved The green wash-coated honeycomb is heat treated typically at about 600° C. for about 6 hours to form the final product washcoated honeycomb.

EXAMPLE 4

About 20.1 parts of barium hydroxide octahydrate are dissolved in hot water (>75° C.) and acidified to pH <2 with nitric acid. This also helps to dissolve any barium carbonate The solution is added to about 276.25 parts of a colloidal alumina suspension, Nyacol Al-20, with constant agitation. The pH is lowered to <4, preferably about 1-2 with $HNO_3$. The acidic pH causes agglomeration of the alumina, whereupon it is no longer suspended. The solid is dried at about 80°-100° C. It is then heat treated at about 600° C. for about 6 hours. After heat treating, the BaO content in the solid is about 15%, assuming all the barium ions adsorbed on the $Al_2O_3$. This solid is added to other materials to form a washcoating slurry which is applied to a honeycomb as described in Examples 2 and 3.

EXAMPLE 5

FIG. 1 shows the effect of baria content on surface area preservation after heat treating at 600° C. and 1000° C. Catapal B is a boehmite material (AlOOH) made by Vista Chemical. Its nominal surface area is about 254 m²/g as received from the manufacturer. After heat treating at 600° C. for 6 hours, its surface area decreases to about 200 m²/g. If an aqueous solution of barium hydroxide, acidified to a pH of ≧2 with nitric acid, is added to Catapal B before heat treating, more surface area is preserved after calcination with baria that with alumina alone. While some loss occurs at higher temperatures, e.g. 1000° C., more surface area of alumina is retained in the presence of barium oxide than alumina alone.

Figure 2:
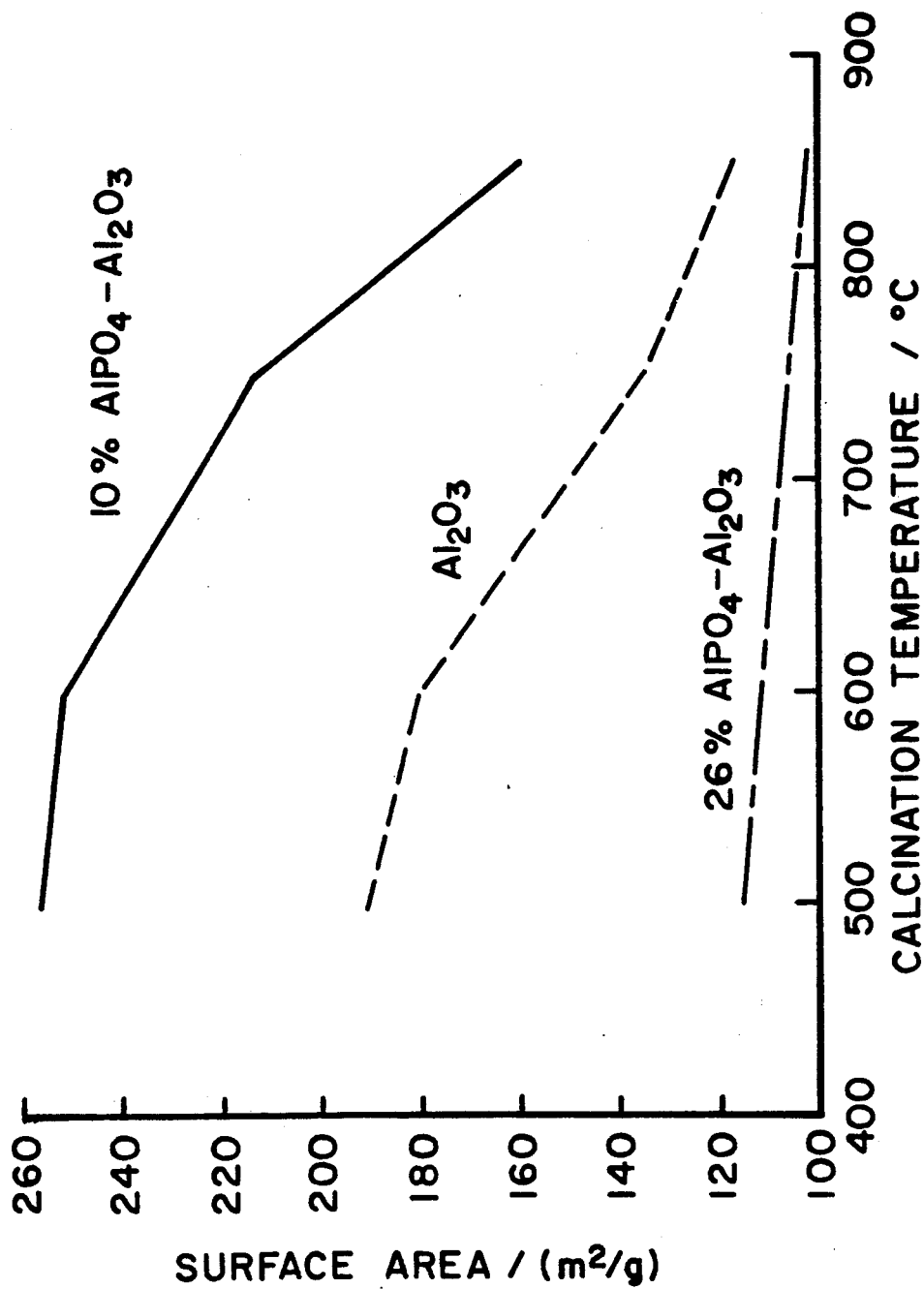
FIG. 2 is plot of surface area versus weight percent BaO in the $BaO-Al_2O_3$ washcoat after heat treating for about 6 hours at temperatures of about 600° C. and about 1000° C., in which the source of $Al_2O_3$ is SBa-200 Gamma Alumina.
Figure 1:
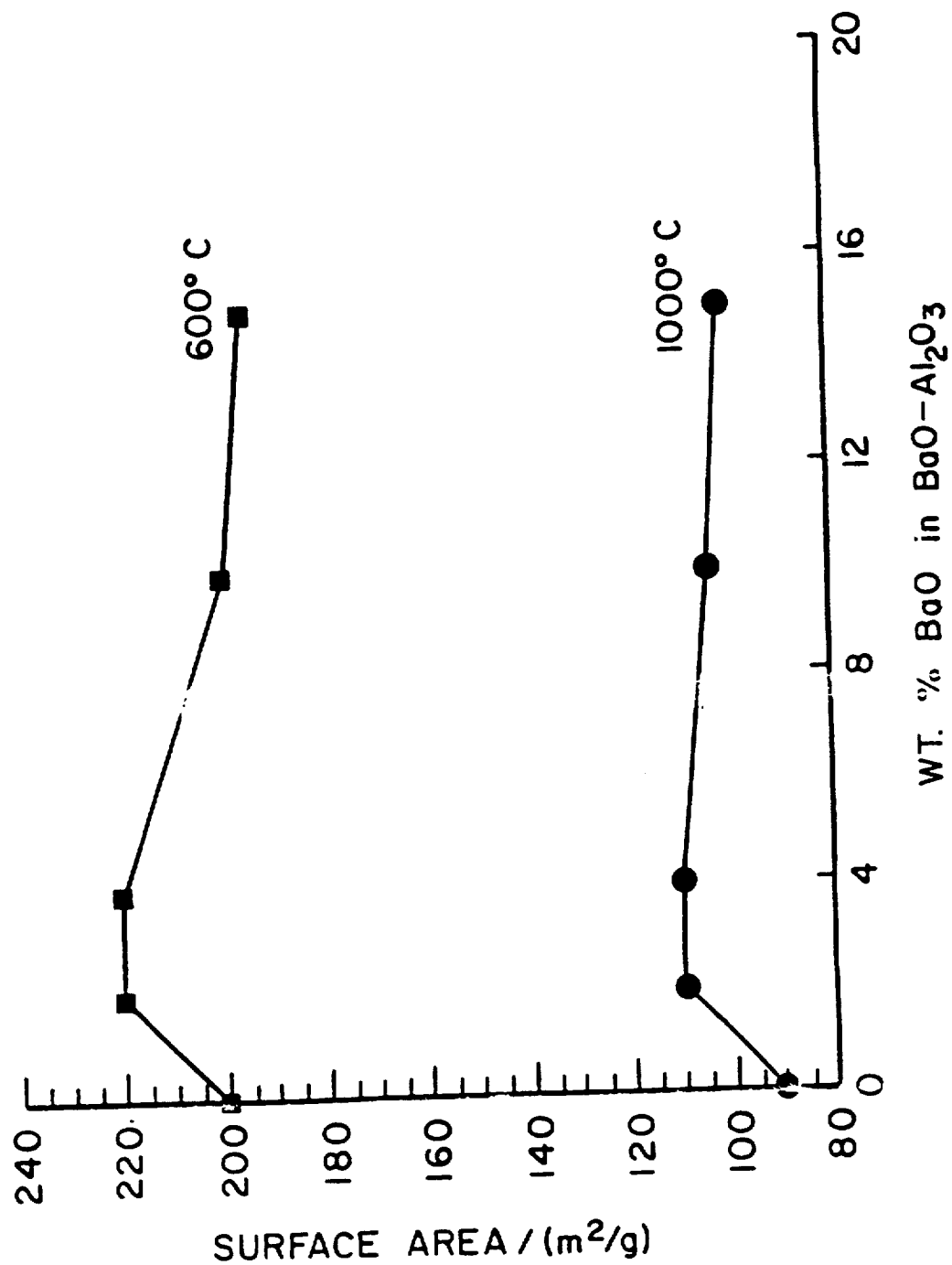
Figure 2:
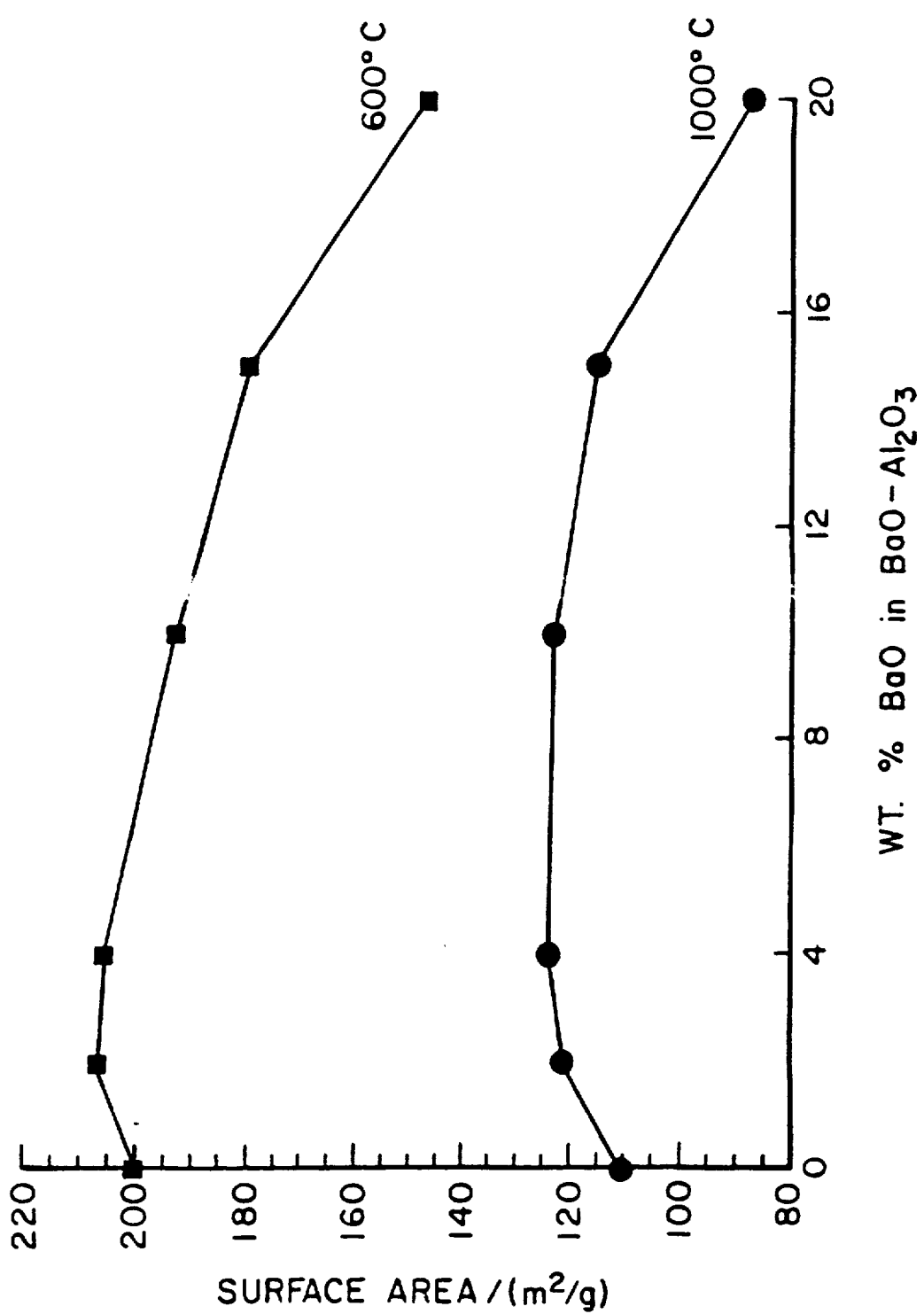

FIG. 2 shows the same tendency of baria to inhibit surface area loss of alumina In this set of samples, a gamma alumina, SBa-200 by Condea, is used. If an aqueous solution of barium hydroxide, acidified to pH of >2 with nitric acid, is added to SBa-200 before heat treating, surface area is preserved after calcination at 600 and 1000° C. While surface area preservation is sometimes not as great as in the case of boehmite, surface area differences greater than about 20-30 m²/g have been observed between unpromoted gamma alumina and baria-promoted gamma alumina.

EXAMPLE 6

Washcoats of about 20% baria-80% alumina are applied to extruded metal honeycombs using the single slurry method with barium hydroxide The washcoat loading on the substrate is about 120 g/l. It is then impregnated with chloroplatinic acid and rhodium nitrate separately, with Pt and Rh in a 5 to 1 ratio, yielding a total of about 1.4 g/l of metal on the washcoated substrate. Below are the typical light off and 90% conversion temperatures of carbon monoxide, hydrocarbons, and nitric oxide. After aging, the conversion temperatures are still very good. In another sample, 10% barium tungstate-10% baria-10% alumina washcoat is prepared using the single slurry method.

TABLE 1

| Catalyst washcoat | Exhaust Gas Conversions | 50% conversion temperature, °C. | 90% conversion temperature, °C. |
|---|---|---|---|
| BaO—$Al_2O_3$ | CO | 227(312) | 240(345) |
|  | HC | 250(338) | 325(560) |
|  | $NO_x$ | 233(312) | 250(345) |
| BaO—$BaWO_4$—$Al_2O_3$ | CO | 226 | 280 |
|  | HC | 288 | 350 |
|  | $NO_x$ | 282 | 305 |

Values in parentheses represent conversions after aging in an engine dynamometer at about 750° C. for about 30 hours The results show that the washcoat made by the present invention functions effectively to hold noble metals It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for producing a washcoat on a substrate, the method comprising:
    a) forming a slurry comprising
        i) at least one ionizable compound of A, where A is selected from barium, strontium, and combinations thereof, and A is in an amount sufficient to yield AO in an amount of about b 0.2-20% by weight of the washcoat.
        ii) an aluminum oxide yielding species, and
        iii) a medium wherein at least a portion of said ionizable compound ionizes to from ions of A;
    b) contacting said slurry with a substrate to form a green coating containing A and the aluminum oxide yielding species therein; and
    c) heat treating the resulting green-coated substrate at a temperature of about 500° C. to about 700° C. and for a time sufficient to form a washcoat containing AO-$Al_2O_3$ on said substrate, wherein A is homogeneously distributed throughout said $Al_2O_3$, said washcoat having a specific surface area, as measured by the $N_2$ BET method, of at least about 50 m²/g, which surface area remains after at least two repeated exposures of the washcoat to temperatures of greater than about 500° C.

2. A method of claim 1 wherein said A is barium.

3. A method of claim 2 wherein said ionizable compound is selected from the group consisting of barium acetate, barium hydroxide, barium oxide, barium alkoxides, and mixtures thereof.

4. A method of claim 3 wherein said ionizable compound is barium acetate.

5. A method of claim 3 wherein said ionizable compound is barium hydroxide.

6. A method of claim 1 wherein said aluminum oxide yielding species is selected from the group consisting of aluminum oxide, species capable of decomposing to aluminum oxide when exposed to temperatures of heat treating, and combinations thereof.

7. A method of claim 6 wherein said aluminum oxide yielding species is species capable of decomposing to aluminum oxide when exposed to temperatures of heat treating.

8. A method of claim 1 wherein said aluminum oxide yielding species is selected from the group consisting of aluminum hydroxylated oxides, aluminum hydroxides, gamma alumina, and aluminum alkoxides.

9. A method of claim 1 wherein said medium is water.

10. A method of claim 1 wherein said slurry further comprises additional components selected from at least one rheological modifier, at least one binder, and combinations thereof.

11. A method of claim 10 wherein said rheological modifier is at least one rare earth oxide.

12. A method of claim 11 wherein said rare earth oxide is an oxide of an element having the atomic number in the range of 57 through 62.

13. A method of claim 12 wherein said rare earth oxide is cerium oxide.

14. A method of claim 13 wherein said washcoat consists essentially of, in percent by weight about 2 to about 20 BaO, about 0 1 to about 25 $CeO_2$, 0 to about 10 binder, and the balance substantially $Al_2O_3$.

15. A method of claim 14 wherein said $CeO_2$ content is about 20% to about 25% by weight.

16. A method of claim 14 wherein the $CeO_2$ content is about 0.1% to about 15% by weight.

17. A method of claim 16 wherein the $CeO_2$ content is about 0.1% to about 5% by weight.

18. A method of claim 14 wherein said BaO content is about 8% to about 12% by weight.

19. A method of claim 14 wherein said binder content is about 5% to about 10% by weight.

20. A method of claim 1 wherein said washcoat consists essentially of, in percent by weight about 0.2 to about 20 BaO, about 20 to about 25 $CeO_2$, about 5 to about 10 binder, and the balance substantially $Al_2O_3$.

21. A method of claim 20 wherein the BaO content is about to about 20% by weight.

22. A method of claim 10 wherein said binder is selected from boehmite, colloidal alumina, and combinations thereof.

23. A method of claim 1 wherein said surface area is at least about 150 m$^2$/g.

24. A method of claim 23 wherein said surface area is about 180 to about 250 m$^2$/g.

25. A method of claim 1 wherein said substrate is a honey-comb structure.

26. A method of claim 1 wherein said substrate is made of material selected from the group consisting of ceramic, glass-ceramic, glass, cermet, metal, carbon, high surface area high temperature stable oxides, and combinations thereof.

27. A washcoated substrate produced by the method of claim 1.

28. A method of claim 1 wherein the forming step (a) further comprises:
   d) removing the liquid phase of said slurry from the solid phase of said slurry;
   e) firing the solid phase at a temperature and for a time sufficient to form a fired material comprising $AO-Al_2O_3$;
   f) forming another slurry comprising
      i) the fired material, and
      ii) a medium,
      and providing said another slurry as the slurry in step (b).

29. A method of claim 1 wherein at least one molecular sieve is included in said slurry whereby a molecular sieve catalyst is incorporated into said washcoat in step (c)

30. A method of claim 1 comprising the additional steps of impregnating said washcoat with at least one metal catalyst precursor followed by firing the resulting impregnated washcoat to form a highly dispersed metal catalyst thereon.

* * * * *

UNITED STATES PATENT AND TRADEMARK OFFICE
CERTIFICATE OF CORRECTION

PATENT NO. : 5,212,130
DATED : May 18, 1993
INVENTOR(S) : W. P. Addiego; I. M. Lachman; M. D. Patil; J. L. Williams; M. R. Williams; K. E. Zaun It is certified that error appears in the above-indentified patent and that said Letters Patent is hereby corrected as shown below:

Col. 12, line 34, delete "b"                         Claim 1

Col. 12, line 41, "therein"                          Claim 1
should be "thereon"

Col. 13, line 21, "0 1"                              Claim 14
should be "0.1"

Col. 13, line 38, insert "2%"                        Claim 21
after the first occurrence
of "about"

Col. 14, line 9, "honey-comb"                        Claim 25
should be "honeycomb"

UNITED STATES PATENT AND TRADEMARK OFFICE
CERTIFICATE OF CORRECTION

PATENT NO. : 5,212,130
DATED : May 18, 1993
INVENTOR(S) : W. P. Addiego; I. M. Lachman; M. D. Patil; J. L. Williams
M. R. Williams; K. E. Zaun It is certified that error appears in the above-indentified patent and that said Letters Patent is hereby corrected as shown below:

The drawing sheet, consisting of Figs.1 and 2, should be deleted to be replaced with the drawing sheets, consisting of Figs. 1 and 2 as shown on the attached pages.

Signed and Sealed this

Twenty-fourth Day of October, 1995

Attest:

BRUCE LEHMAN

*Attesting Officer*     *Commissioner of Patents and Trademarks*